US010425980B2

(12) United States Patent
Jung et al.

(10) Patent No.: US 10,425,980 B2
(45) Date of Patent: Sep. 24, 2019

(54) METHOD AND APPARATUS FOR CONNECTING TO ACCESS POINT IN PORTABLE TERMINAL

(71) Applicant: Samsung Electronics Co., Ltd., Suwon-si, Gyeonggi-do (KR)

(72) Inventors: Ji-Hyun Jung, Seoul (KR); Edwin Joseph Vimal Bastin, Suwon-si (KR); Bu-Seop Jung, Suwon-si (KR); Jong-Mu Choi, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/453,494

(22) Filed: Mar. 8, 2017

(65) Prior Publication Data

US 2017/0181077 A1 Jun. 22, 2017

Related U.S. Application Data

(63) Continuation of application No. 14/082,990, filed on Nov. 18, 2013, now abandoned.

(30) Foreign Application Priority Data

Nov. 16, 2012 (KR) ........................ 10-2012-0130547

(51) Int. Cl.
*H04W 76/14* (2018.01)
*H04W 76/10* (2018.01)
(Continued)

(52) U.S. Cl.
CPC ........... *H04W 76/14* (2018.02); *H04W 48/16* (2013.01); *H04W 48/20* (2013.01); *H04W 76/10* (2018.02); *H04W 84/12* (2013.01)

(58) Field of Classification Search
CPC ..... H04W 48/20; H04W 76/14; H04W 76/10; H04W 48/16; H04W 84/12
See application file for complete search history.

(56) References Cited

U.S. PATENT DOCUMENTS

2008/0075035 A1 3/2008 Eichenberger
2011/0216692 A1 9/2011 Lundsgaard et al.
(Continued)

FOREIGN PATENT DOCUMENTS

CN 101282306 A 10/2008
WO 2011/132174 A1 10/2011

OTHER PUBLICATIONS

IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, Feb. 28, 2006, IEEE Std. 802.16e-2005 and IEEE Std. 802.16-2004/Cor1-2005), IEEE, New York, US.

(Continued)

*Primary Examiner* — Omar J Ghowrwal
(74) *Attorney, Agent, or Firm* — Jefferson IP Law, LLP

(57) ABSTRACT

A method of connecting to an Access Point (AP) in a portable terminal is provided. The method includes scanning at least one first AP and at least one second AP that has a different connection scheme from a connection scheme of the first AP; and checking a connection setting and connecting to any of the first and second APs based on the connection setting.

21 Claims, 4 Drawing Sheets

(51) Int. Cl.
*H04W 48/20* (2009.01)
*H04W 48/16* (2009.01)
*H04W 84/12* (2009.01)

(56) References Cited

U.S. PATENT DOCUMENTS

| | | | |
|---|---|---|---|
| 2012/0036271 | A1 | 2/2012 | Patil et al. |
| 2012/0188876 | A1 | 7/2012 | Chow et al. |
| 2012/0230304 | A1* | 9/2012 | Barbu .................. H04W 48/18 370/338 |
| 2012/0230305 | A1 | 9/2012 | Barbu et al. |
| 2012/0233688 | A1 | 9/2012 | Tonouchi et al. |
| 2013/0070644 | A1 | 3/2013 | McCann et al. |
| 2014/0004868 | A1 | 1/2014 | Agardh |
| 2014/0010222 | A1* | 1/2014 | Chen .................. H04W 48/16 370/338 |
| 2014/0092805 | A1* | 4/2014 | van de Ven .......... H04W 76/02 370/328 |
| 2014/0092889 | A1 | 4/2014 | Chhabra et al. |
| 2014/0235167 | A1* | 8/2014 | Jung .................... H04W 76/10 455/41.2 |
| 2015/0142983 | A1* | 5/2015 | Yilmaz .............. H04L 67/1095 709/227 |
| 2015/0213133 | A1* | 7/2015 | Jin ..................... H04L 63/0892 707/722 |
| 2015/0282058 | A1* | 10/2015 | Forssell ............... H04W 48/16 455/552.1 |
| 2016/0021609 | A1* | 1/2016 | Park .................... H04W 48/20 370/338 |

OTHER PUBLICATIONS

IEEE P802.11u TM/D13.0, Part 11: Wireless LAN Medium Access Control(MAC) and Physical Layer(PHY) specifications, Amendment 7: Interworking with External Network, Nov. 2010.

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 9: Interworking with External Networks, Feb. 25, 2011, pp. i-190, IEEE Std 802.11u-2011, IEEE, New York, US.

Hotspot 2.0 Specification Phase 1 Version 0.41, Wi-Fi Alliance Technical Committee Hotspot 2.0 Task Group, Mar. 21, 2012.

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Mar. 29, 2012, IEEE Std 802.11-2012, IEEE, New York, US.

WiFi Alliance; Wi-Fi Alliance Hotspot 2.0 Technical Task Group; Wi-Fi Certified Passpoint (Release 1) Deployment Guidelines; Version 1.0; Oct. 2012.

Controller: Define Controller at Dictionary.com. Dictionary.com [online]. [Retrieved on Apr. 7, 2016]. Retrieved from the Internet <URL: http://www.dictionary.com/browse/controller>.

Wi-Fi Certified Passpoint (TM) (Release 1) Deployment Guidelines, Wi-Fi Alliance Hotspot 2.0 Technical Task Group, Wi-Fi Alliance, Version 1.0, Oct. 2012, pp. 1-25.

Chinese Office Action dated Jan. 2, 2018, issued in Chinese Patent Application No. 201310581500.4.

\* cited by examiner

Access Network Query Protocol info ID definitions

| Info Name | Info ID | ANQP Info Element (clause) |
|---|---|---|
| Reserved | 0-255 | n/a |
| ANQP Query list | 256 | 7.3.4.1 |
| ANQP Capability list | 257 | 7.3.4.2 |
| Venue Name information | 258 | 7.3.4.3 |
| Emergency Call Number information | 259 | 7.3.4.4 |
| Network Authentication Type information | 260 | 7.3.4.5 |
| Roaming Consortium list | 261 | 7.3.4.6 |
| IP Address Type Availability information | 262 | 7.3.4.8 |
| NAI Realm list | 263 | 7.3.4.9 |
| 3GPP Cellular Network information | 264 | 7.3.4.10 |
| AP Geospatial Location | 265 | 7.3.4.11 |
| AP Civic Location | 266 | 7.3.4.12 |
| AP Location Public Identifier URI | 267 | 7.3.4.13 |
| Domain Name list | 268 | 7.3.4.14 |
| Emergency Alert Identifier URI | 269 | 7.3.4.15 |
| Emergency NAI | 271 | 7.3.4.16 |
| Reserved | 272-56796 | n/a |
| Access Network Query Protocol vendor-specific list | 56797 | 7.3.4.7 |
| Reserved | 56798-65535 | n/a |

METHOD AND APPARATUS FOR CONNECTING TO ACCESS POINT IN PORTABLE TERMINAL

PRIORITY

This application is a continuation application of prior application Ser. No. 14/082,990, filed on Nov. 18, 2013, which claimed the benefit under 35 U.S.C. § 119(a) of a Korean patent application filed on Nov. 16, 2012 in the Korean Intellectual Property Office and assigned Serial No. 10-2012-0130547, the entire disclosure of which is hereby incorporated by reference.

BACKGROUND OF THE INVENTION

1. Field of the Invention

The present invention relates to establishing a connection to an Access Point (AP). More particularly, the present invention relates to a method and apparatus for connecting to an AP among first and second APs that have different connection schemes.

2. Description of the Related Art

With advancements in communication technologies, recent portable terminals (e.g., smartphones) are now provided with Bada®, Tizen®, iOS®, Android, and other advanced operating systems. With the advanced features and conveniences provided by these operating systems, portable terminals are increasingly popular.

An important aspect of such operating systems is the provision of advanced functions and utilities. To ensure adequate use of the advanced functions and utilities, it is important to provide sufficient data communication.

For example, to efficiently use functions of email, Internet browsing, Kakao Talk®, Facebook®, Twitter®, and the like, data communication must be enabled. In other words, data communication is essential for the portable terminals, such as smartphones, to be conveniently used.

Data communication of the portable terminal is performed through a wireless transceiver by communicating with a base station or through a short-range communication module, e.g., a Wireless Fidelity (WI-FI) module by connecting to an Access Point (AP).

Data communication using a wireless transceiver has some disadvantages, such as cost burden of the data communication, quick exhaustion of a battery of the portable terminal, etc.

On the contrary, data communication via an AP connection has many advantages in that there are a growing number of public APs available for free, that installation of private APs (e.g., at home or in offices) is easy, and that such data communication via the AP connection consumes less battery power. Thus, a user of a portable terminal tends to prefer data communication via an AP connection as opposed to data communication using the wireless transceiver.

In the method of connecting to an AP of the related art, once a particular AP, such as a hotspot (e.g., a public AP) or a private AP (e.g., an AP at the user's home) is completed, information that is required to connect to the AP, e.g., authentication information, is stored in the portable terminal, which is later used for an automatic connection to the AP. Hence, the user is not inconvenienced by needing to input the information each time an AP connection is desired.

On the other hand, the method of the related art requires a complicated procedure to connect to a new AP to which the user has never been connected by e.g., selecting the AP and inputting authentication information for the AP. Furthermore, the method of the related art is relatively vulnerable to security and has little coverage.

Hotspot 2.0, a scheme of connecting to an AP, has been proposed to supplement the foregoing AP connecting method of the related art. Since Hotspot 2.0 supports WI-FI roaming (e.g., roaming between APs and roaming between an AP and a base station), even if the portable terminal roams, the portable terminal is still able to perform data communication without AP disconnection.

For example, in case Korea's telecommunication company, KT Corp. and America's telecommunication company, AT&T agreed on the WI-FI roaming, it is possible for a user to conveniently use APs provided by KT Corp. in Korea and APs provided by AT&T in the USA without the need for separate authentication.

On the other hand, although Hotspot 2.0 has been proposed, the number of APs that support Hotspot 2.0 still remains low. Also, even if the number of APs that support Hotspot 2.0 increases, there are still many legacy APs that do not support Hotspot 2.0.

Thus, because there is a mix of APs that do and do not support Hotspot 2.0, a technique of more conveniently connecting to an AP that is more favorable to the user is desirable.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for quickly and conveniently connecting to an Access Point (AP) when first and second APs that have different connection schemes are scanned at the same time. It is an aim of certain embodiments of the invention to solve, mitigate or obviate, at least partly, at least one of the problems and/or disadvantages associated with the prior art. Certain embodiments aim to provide at least one of the advantages described below.

In accordance with an aspect of the present invention, a method of connecting to an AP in a portable terminal is provided. The method can also be described as a method of connecting a portable terminal to an AP, and may be a method implemented by a portable terminal. The method includes scanning at least one first AP and at least one second AP that has a different connection scheme from a connection scheme of the first AP, and checking a connection setting and connecting to any (e.g., to a selected one) of the first and second APs based on the connection setting.

In certain embodiments the connecting to any of the first and second APs based on the connection setting comprises determining that there is at least one AP that has previously been connected to the portable terminal among the first APs, determining that there is at least one AP connectable to the portable terminal among the second APs, and connecting the portable terminal to an AP selected from the previously connected AP or APs from the first APs and the connectable AP or APs from the second APs according to at least one selection criterion.

In accordance with another aspect of the present invention, an apparatus for connecting to an AP in a portable terminal is provided. The apparatus includes a communication module (e.g., a short-range communication module) configured to provide communication module (e.g., a short-range communication function), and a controller configured to scan at least one first AP and at least one second AP that has a different connection scheme from a connection scheme of the first AP, and check a connection setting and selectively connect to any (e.g., to one) of the first and second APs based on the connection setting.

Another aspect of the invention provides a portable terminal adapted to implement a method in accordance with one of the above-described aspects.

Another aspect of the invention provides a portable terminal comprising apparatus in accordance with one of the above-described aspects.

Another aspect of the invention provides a portable terminal comprising a communication module (e.g., a short-range communication module) configured to provide a communication function (e.g., a short-range communication function), and a controller configured to scan at least one first AP and at least one second AP that has a different connection scheme from a connection scheme of the first AP, and check a connection setting and selectively connect to any (e.g., to one) of the first and second APs based on the connection setting.

Another aspect of the invention provides a computer program comprising instructions arranged, when executed, to implement a method and/or apparatus in accordance with any one of the above-described aspects. A further aspect provides machine-readable storage storing such a program.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 illustrates a format of identification information to be exchanged to use Hotspot 2.0 according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In an embodiment of the present invention, it is assumed that a first Access Point (AP) supports Hotspot 2.0 and a second AP does not support Hotspot 2.0.

Figure 1:
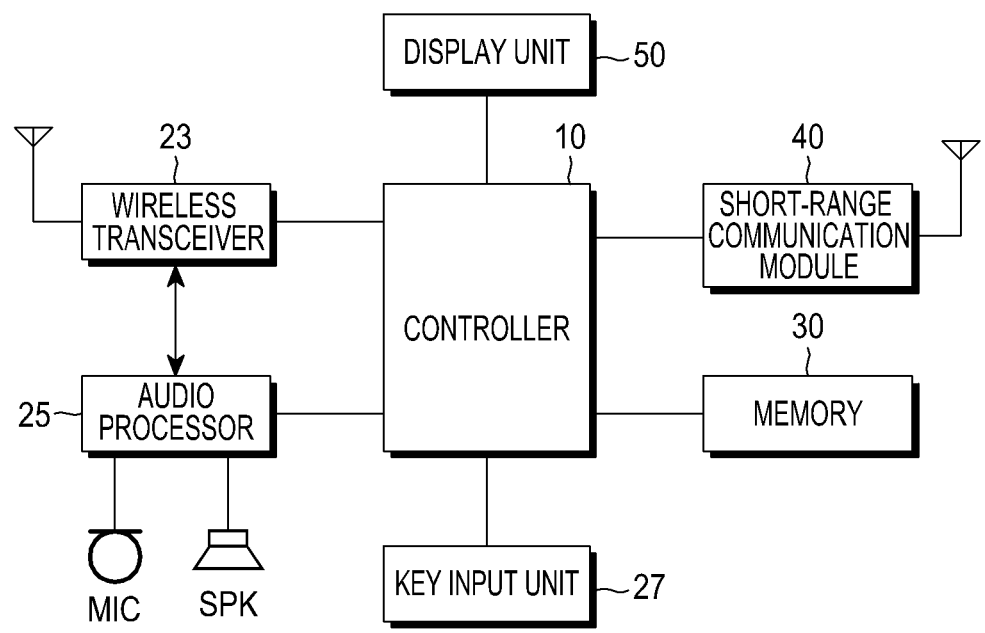
FIG. 1 is a block diagram of a portable terminal according to an exemplary embodiment of the present invention.

FIG. 1 is a block diagram of a portable terminal according to an exemplary embodiment of the present invention.

In the following description, it is assumed that the portable terminal is an easy-to-carry mobile electronic device. In an exemplary implementation, the portable terminal may include any of various feature phones and devices, such as those driven by Bada®, Tizen®, Windows® series (e.g., Windows 8), iOS®, Android, and the like, such as smartphones and tablets. Of course, this list is merely exemplary and not to be considered limiting. That is, the portable terminal may also be an e-book reader, a portable computer (e.g., notebook), a portable game console (e.g., PSP), a digital camera, or the like. Again, it will be appreciated that the portable terminal is not limited to the foregoing examples.

Referring to FIG. 1, the portable terminal includes a controller 10, a wireless transceiver 23, an audio processor 25, a key input unit 27, a memory 30, a short-range communication module 40, and a display unit 50. Of course, it is to be understood that the portable terminal may include additional components that are not described herein for convenience.

In an exemplary implementation, the wireless transceiver 23 includes a Radio Frequency (RF) unit and a modem (not shown). The RF unit includes an RF transmitter for up converting the frequency of a signal for transmission and amplifying the signal, and an RF receiver for low-noise amplifying a received signal and down converting the frequency of the received signal. The modem includes a transmitter for encoding and modulating the signal for transmission and a receiver for demodulating and decoding the signal received from the RF unit.

The audio processor 25 may constitute a codec that includes a data codec and an audio codec. The data codec processes e.g., packet data, and the audio codec processes e.g., sound and multimedia files.

The audio processor 25 also converts digital audio signals received from the modem into analog signals and plays the analog signals, or converts analog audio signals generated by a microphone into digital audio signals through the audio codec and transmits the digital audio signals to the modem. The audio codec may be separately included in the portable terminal, or may be incorporated into the controller 10 of the portable terminal.

The key input unit 27 may include keys required to input number and character information, function keys required to set different functions, a touch pad, etc. If the display unit 50 is implemented with a capacitive sensing or pressure sensing touch display screen, the key input unit 27 may include only a predetermined minimum number of keys and the display unit 50 may replace some key functions.

The memory 30 may include a program memory and a data memory. In an exemplary implementation, the program memory stores a program to control general operations of the portable terminal. The memory 30 may further include an external memory, such as Compact Flash (CF), Secure Digital (SD), Micro Secure Digital (Micro-SD), Mini Secure Digital (Mini-SD), extreme Digital (xD), a memory stick, and the like. The memory 30 may also include a disc, such as a Hard Disc Drive (HDD), a Solid State Disc (SSD), and the like.

In an exemplary embodiment of the present invention, the memory 30 stores Access Point (AP) profile information including information (e.g., a credential) required for an automatic connection to an AP to which a connection was ever completed or successful. The controller 10 uses the AP profile information stored in the memory 30 to perform a series of operations to enable automatic connection to an AP that has ever been connected (connection completed) without user involvement.

The profile information further includes selection information about favored APs or other information, such as access history to APs. The controller 10 uses the AP profile information to perform a series of operations to preferentially connect to an AP favored by the user among a number of scanned APs or a series of operations to preferentially connect to an AP that has most recently been connected or an AP that has most frequently been used among a number of scanned APs.

The short-range communication module 40 provides a short-range communication function, such as Wireless Fidelity (WI-FI), Wibro, mobile Worldwide Interoperability for Microwave Access (WIMAX), and the like. For example, the short-range communication module 40 may provide the user with the short-range communication function via AP connection based on the Institute of Electrical and Electronics Engineers (IEEE) 802.11 standard. In an exemplary embodiment of the present invention, the short-range communication module 40 is assumed to support Hotspot 2.0 based on the IEEE 802.11u specification. It will be appreciated that, in this specification, "short range" means relatively short range in the telecommunications context, i.e., a range typical in the above-mentioned short-range communication schemes and standards, such as a range up to 1 m, 10 m, 100 m, or 1000 m.

The controller 10 may scan APs around the portable terminal by repeatedly performing channel scanning, listening, and searching on a predetermined cycle basis in conjunction with the short-range communication module 40.

For example, the short-range communication module 40 may perform scanning at an interval determined in advance under control of the controller 10 (i.e., active scanning). The short-range communication module 40 may transmit a probe request signal during scanning and receive different information required for access, e.g., credentials, with which the controller 10 may scan APs around the portable terminal. The credentials may include cryptographic aggregate information, including information, such as authentication type, encryption type, network key, Service Set IDentification (SSID), etc.

The display unit 50 may be a Liquid Crystal Display (LCD) or be formed of Organic Light Emitting Diodes (OLEDs), such as Passive Matrix Organic Light Emitting Diodes (PMOLEDs) or Active Matrix Organic Light Emitting Diodes (AMOLEDs), and output different display information generated by the portable terminal. The display unit 50 may operate as an input unit together with the key input unit 27 to control the portable terminal by including e.g., a capacitive or pressure sensitive touch screen.

In an exemplary implementation, the display unit 50 may display a list of scanned APs at the user's request or based on whether a specific condition is satisfied. For example, if there is no connectable AP among the scanned first and second APs, the controller 10 may display the list of scanned APs in the display unit 50.

The controller 10 controls general operations of the portable terminal. The controller 10 controls a series of operations in relation to implementing the exemplary method of connecting to an AP in the portable terminal, the method including scanning at least one first AP, scanning at least one second AP that has a different connection scheme than that of the first AP, and connecting to any of the first and second APs based on connection settings. More detailed operations of the controller 10 will be described below.

Figure 2:
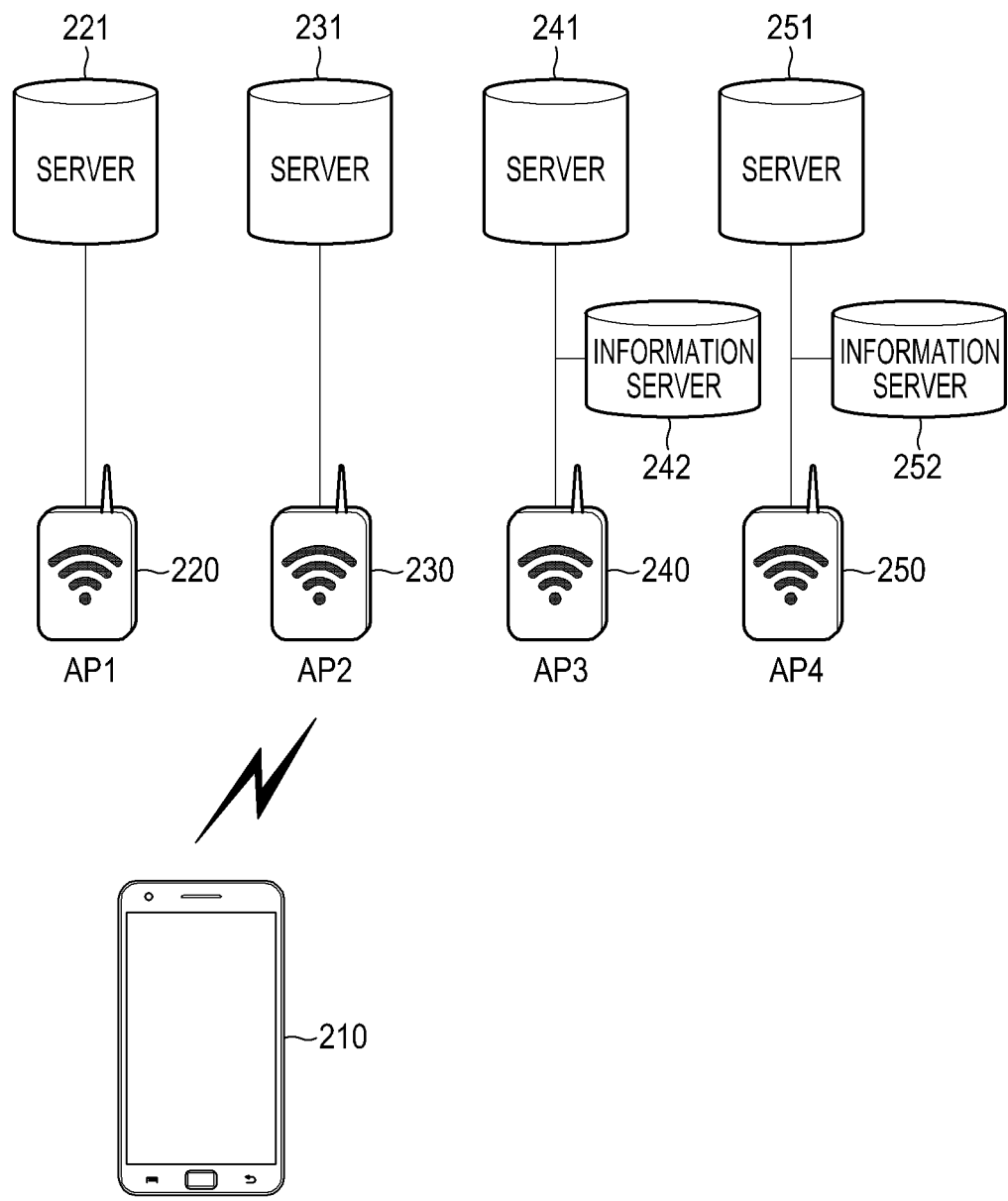
FIG. 2 illustrates a process of connecting to an Access Point (AP) in a portable terminal according to an exemplary embodiment of the present invention.

FIG. 2 illustrates a process of connecting to an Access Point (AP) in a portable terminal according to an exemplary embodiment of the present invention. FIG. 4 illustrates a format of identification information to be exchanged to use Hotspot 2.0 according to an exemplary embodiment of the present invention.

Referring to FIGS. 2 and 4, an exemplary embodiment of the present invention in which APs are scanned by a portable terminal will be described in detail below.

Referring to FIG. 2, AP1 220 and AP2 230 are first APs while AP3 240 and AP4 250 are second APs.

The portable terminal 210 may scan AP1 to AP4 220 to 250 through active scanning or passive scanning. For example, the portable terminal 210 may obtain a probe response signal that includes a MAC address and other various parameters required for AP connection from AP1 220 and AP2 230 through servers 221 and 231 and a gateway (not shown).

Servers 221, 231, 241, and 251 generally manage Internet services through APs, an example of which is an Authentication Authorization Accounting (AAA) server that controls login, authentication, logoff, accounting, and the like related to AP usage of the portable terminal 210.

Servers 221 and 231 transmit and receive information necessary for AP connection (or AP usage) of the portable terminal 210 through APs 220 and 230 and a gateway (not shown), and servers 241 and 251 transmit and receive information necessary for AP connection (or AP usage) of the portable terminal 210 through APs 240 and 250 and a gateway (not shown). On the other hand, in preparation for the first APs, APs 240 and 250 may further be connected to information server 242 or 252.

The information server 242 or 252 may be e.g., an Access Network Query Protocol (ANQP) server and transmits identification information (e.g., ANQP information) in a format 410 of FIG. 4 based on the portable terminal's query. After that, the portable terminal 210 determines whether it is possible to connect to any of the APs connected to the information server by comparing the received identification information with a credential (the credential for connection to the second AP) stored in the portable terminal 210.

In an exemplary implementation, the portable terminal 210 stores the credential information for connection to the second AP in the memory 30 beforehand. Examples of the credential information for connection to the second AP may include information of Domain, Organizational Identifier (OI), IMSI value, realm, ca_cert, private_key, client_cert, identity, password, and the like.

Some of the credential information will be briefly described below.

Domain is a domain name of a telecom service provider (e.g., www.skt.com) to which the portable terminal subscribes, and if the domain information contained in the credential stored in the memory 30 matches a value of a domain name list contained in the ANQP information received from an AP, the portable terminal may attempt to connect to the AP. Similarly, OI is a value of an OI of the telecom service provider to which the portable terminal 210 subscribes, and if the same OI is included in the value of a Roaming Consortium list in the ANQP information received from an AP, the controller 10 may attempt to connect to the AP.

Figure 3:
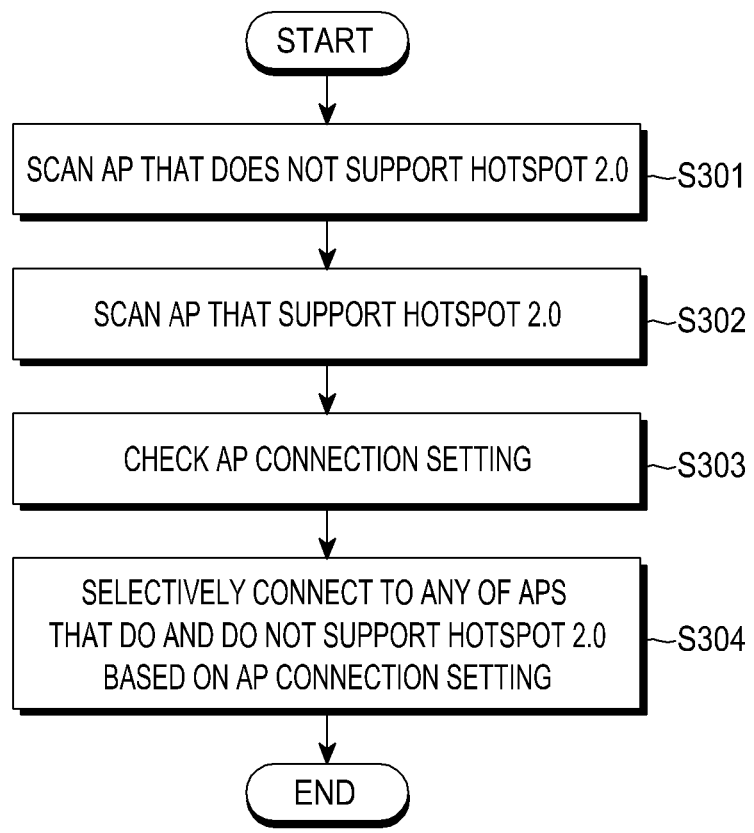
FIG. 3 is a flowchart of a process to connect to an AP in a portable terminal according to an exemplary embodiment of the present invention.

FIG. 3 is a flowchart of a process to connect to an AP in the portable terminal according to an exemplary embodiment of the present invention.

Referring to FIGS. 1 to 4, an exemplary embodiment will be described in detail below.

At step S301, the controller 10 controls first APs to be scanned.

As shown in FIG. 2, assuming that there are APs 220 to 250 in the scanning range of the portable terminal 210, among which APs 220 and 230 are first APs, the controller 10 scans the first APs 220 and 230.

The controller 10 scans the APs 220 and 230 through either active scanning or passive scanning.

For example, the controller 10 may scan the APs by transmitting the probe request signal through the short-range communication module 40 and receiving the probe response signal containing the MAC addresses and other various parameters required for AP connection from the APs 220 and 230 to which the probe request signal is sent.

Alternatively, the controller 10 may scan APs 220 and 230 by receiving beacon signals from the APs 220 and 230 in a standby mode, the beacon signal having a MAC address and other various parameters required for AP connection.

At step S302, the controller 10 controls second APs to be scanned.

Referring to FIG. 2, among APs 220 to 250, APs 240 and 250 of FIG. 2 are second APs. The controller 10 may determine whether the APs 240 and 250 are second APs by receiving from the APs 240 and 250 information distinguishable from that of the first APs.

In other words, the controller 10 may determine whether an AP supports Hotspot 2.0 from the probe response signal or the beacon signal that includes information (e.g., a Hotspot 2.0 Indication element) about whether the AP is the second AP received through AP scanning using the short-range communication module 40.

For example, the controller 10 may determine that scanned APs 240 and 250 support Hotspot 2.0 by receiving, from the APs 240 and 250, the information in a format as in Table 1 to identify whether the APs 240 and 250 support Hotspot 2.0 (e.g., a Hotspot 2.0 Indication element).

TABLE 1

| Element ID | Length | OI | Type | Hotspot Configuration |
| --- | --- | --- | --- | --- |

The controller 10 checks AP connection settings at steps 303 and controls selective connection to any of the first and second APs based on the AP connection settings at step 304.

In an exemplary embodiment of the present invention, automatic selective connection to any of the first and second APs is made based on the AP connection settings in case the first and second APs are scanned at the same time.

Such automatic selective connection to an AP will now be described.

First, if the first and second APs are scanned at the same time, the priority may lie in connection to the first AP. In this case, the controller 10 controls a connectable AP among the first APs to be connected.

For example, the controller 10 may check AP profile information stored in the memory 30 and connect to an AP found to have ever been previously connected (i.e., connectable), no matter whether there is any connectable AP among the scanned second APs. In other words, the controller 10 may check stored information and connect to an AP that the information indicates had previously (i.e., at at least one previous time) been connected to the portable terminal, irrespective (i.e., regardless) of whether there is any connectable AP among the scanned second APs. As described above in connection with FIG. 2, whether there is a connectable AP among the scanned second APs is determined by the controller 10 determining if the credential information stored in the memory 30 matches the identification information or ANQP information shown in FIG. 4.

In an exemplary embodiment of the present invention, it is assumed that the first APs are free APs while the second APs are paid-for APs, and thus the exemplary embodiment of the automatic selective AP connection giving priority to connecting to the free AP that does not support Hotspot 2.0 may save the communication expenses as much as possible.

In another exemplary embodiment of the present invention, if the first and second APs are scanned at the same time, the priority may lie in connection to a second AP. In this case, the controller 10 controls a connectable AP among the scanned second APs to be connected, no matter whether there is an AP found to have ever been previously connected among (i.e., to the portable terminal) the first APs.

That is, the controller 10 controls a connectable AP among the scanned second APs to be connected, even if an AP that has ever been previously connected is found among the first APs.

This exemplary embodiment may be favorably implemented in roaming between APs to provide seamless communication using second APs by taking into consideration that first APs do not support a good roaming service even though they are free and connectable.

In yet another exemplary embodiment of the present invention, the automatic selective AP connection may be made such that an optimal AP (for example an AP that is optimal according to at least one criterion) is connected among APs that have ever been previously connected (i.e., connectable APs, being APs that have, at some time in the past, been connected to the portable terminal) among the first APs and connectable APs among the second APs. In this case, the controller 10 may control the most optimal one (e.g., according to at least one criterion) of all the scanned APs to be connected by determining an AP having the largest Received Signal Strength Indication (RSSI) value, an AP having a user-defined SSID name, or an AP that has most recently been connected. Thus, in certain embodiments, RSSI value, SSID name, time of last connection to the portable terminal, and frequency or number of times of previous connection are examples of selection criteria. Other embodiments may use alternative selection criteria. In certain embodiments, the determination of which AP is optimal (i.e., preferred, and to be selected for connection) is made according to a single selection criterion, but in alternative embodiments the determination is made according to two or more selection criteria.

Referring to FIG. 2, assuming that AP 230 is the connectable AP among the first APs and AP 250 is the connectable AP among the second APs, if the AP 250 has the largest RSSI value, has a user-defined SSID name (e.g., a network name, such as SKT), or has most recently been connected, the controller 10 controls the AP 250 to be connected.

The above described exemplary embodiments of the present invention may provide an advantage of automatically connecting the user's portable terminal to an AP most favorable to the user (e.g., most favorable according to at least one criterion).

The controller 10 may control a list of all of the scanned APs to be displayed to the user if there is no AP that has ever been connected (i.e., ever been connected previously to the portable terminal) among the scanned first APs and there is no connectable AP among the scanned second APs. With the list, the user may start a manual procedure of connecting to an AP by selecting the AP from among the APs in the list.

According to exemplary embodiments of the present invention, if first and second APs that have different connection schemes are scanned at the same time, any of the APs may be connected conveniently and quickly.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of connecting to an access point (AP) in a portable terminal, the method comprising:
   scanning signals transmitted from each of a plurality of APs;
   identifying a connection scheme of each of the plurality of APs based on information included in each of the scanned signals;
   when a first AP that does not support a hotspot 2.0 and a second AP that supports a hotspot 2.0 are identified among the plurality of APs based on the connection scheme of each of the plurality of APs, determining a connection setting for connecting to one of the first AP and the second AP;
   selecting an AP from the first AP and the second AP to establish a connection based on the connection setting stored at the portable terminal;
   controlling to establish the connection with the selected AP; and
   controlling to access an information server via the connected AP,
   wherein the controlling to access the information server via the connected AP comprises transmitting an Access Network Query Protocol (ANQP) message for requesting an identification information of the second AP to the information server.

2. The method of claim 1,
   wherein the first AP is not connected to an information server, and
   wherein the second AP is connected to the information server.

3. The method of claim 1,
   wherein the selecting of the AP from the first AP and the second AP comprises selecting the first AP upon determining that the connection setting indicates a priority for an AP that does not support a hotspot,
   wherein, when the connection setting indicates a priority for an AP that does not support a hotspot, the establishing of the connection with the first AP comprises:
      establishing the connection with the first AP based on the AP access history of the first AP and AP profile information of the first AP, and
      ignoring the AP history of the second AP, and
   wherein the AP profile information of the first AP is included in the signal received from the first AP.

4. The method of claim 1,
   wherein the selecting of the AP from the first AP and the second AP comprises selecting the second AP upon determining that the connection setting indicates a priority for an AP that supports a hotspot, and
   wherein, when the connection setting indicates a priority for an AP that supports a hotspot, the establishing of the connection with the second AP comprises:
      establishing the connection with the second AP, and
      ignoring the AP history of the first AP.

5. The method of claim 1, wherein, when the connection setting indicates a priority for an AP based on a received signal strength indication (RSSI), the method further comprises:
   identifying whether the portable terminal has ever been previously connected to the first AP;
   identifying that the portable terminal is capable of connecting with the second AP;
   identifying an RSSI value for the first AP;
   identifying an RSSI value for the second AP;
   comparing the RSSI value of the first AP to the RSSI value of the second AP;
   establishing the connection with the first AP when the RSSI value of the first AP is greater than the RSSI value of the second AP; and
   establishing the connection with the second AP when the RSSI value of the second AP is greater than the RSSI value of the first AP.

6. The method of claim 1, wherein, when the connection setting indicates a priority for an AP based on a service set identification (SSID), the method further comprises:
   identifying whether the portable terminal has ever previously been connected to the first AP or the second AP, based on the connection information;
   identifying an SSID of the first AP and of the second AP, upon identifying that the portable terminal has previously been connected to the first AP and the second AP;
   establishing the connection with the first AP when the SSID of the first AP matches a predetermined SSID; and
   establishing the connection with the second AP when the SSID of the second AP matches the predetermined SSID.

7. The method of claim 1, wherein, when the connection setting indicates a priority for an AP based on a time from a last connection, the method further comprises:
   identifying whether the portable terminal has ever previously been connected to the first AP or the second AP, based on the connection information,
   establishing the connection with the first AP, upon identifying that the portable terminal was most recently connected to the first AP, and
   establishing the connection with the second AP, upon identifying that the portable terminal was most recently connected to the second AP.

8. The method of claim 1, further comprising:
   identifying whether the portable terminal has ever been previously connected to the first AP and the second AP, based on the signals received from the first AP and the second AP; and
   displaying, on a display of the portable terminal, a list including the first AP and the second AP, when the portable terminal has not previously been connected to the first AP and the second AP.

9. The method of claim 1,
   wherein the first AP is one of a first plurality of APs,
   wherein the second AP is one of a second plurality of APs,
   wherein the connection setting and the connection scheme of the first AP comprises a connection setting and a connection scheme for the first plurality of APs, and
   wherein the connection setting and the connection scheme of the second AP comprises a connection setting and a connection scheme for the second plurality of APs.

10. A portable terminal for connecting to an access point (AP), the portable terminal comprising:
    a transceiver configured to communicate using a short-range communication scheme; and
    at least one processor configured to:
       scan signals transmitted from each of a plurality of APs,
       identify a connection scheme of each of the plurality of APs based on information included in each of the scanned signals,
       when a first AP that does not support a hotspot 2.0 and a second AP that supports a hotspot 2.0 are identified among the plurality of APs based on the connection scheme of each of the scanned signals, determine a connection setting for connecting to one of the first AP and the second AP,
       select an AP from the first AP and the second AP to establish a connection, based on the connection setting stored at the portable terminal,
       control to establish the connection with the selected AP, and
       control to access an information server via the connected AP,
    wherein, when controlling to access to the information server via the connected AP, the at least one processor is configured to transmit an Access Network Query Protocol (ANQP) message for requesting an identification information of the second AP to the information server.

11. The portable terminal of claim 10,
    wherein the first AP is not connected to an information server, and
    wherein the second AP is connected to the information server.

12. The portable terminal of claim 10,
    wherein, to select the AP from the first AP and the second AP, the at least one processor is configured to select the first AP upon determining that the connection setting indicates a priority for an AP that does not support a hotspot,
    wherein, when the connection setting indicates a priority for an AP that does not support a hotspot, to establish the connection with the first AP, the at least one processor is configured to control to:
       establish the connection with the first AP based on the AP access history and AP profile information of the first AP, and
       ignore the AP history of the second AP, and
    wherein the AP profile information of the first AP is included in the signal received from the first AP.

13. The portable terminal of claim 10,
    wherein, to select the AP from the first AP and the second AP, the at least one processor is further configured to select the second AP upon determining that the connection setting indicates a priority for an AP that supports a hotspot, and
    wherein, when the connection setting indicates a priority for an AP that supports a hotspot, to establish the connection with the second AP, the at least one processor is configured to control to:
       establish the connection with the second AP, and
       ignore the AP access history of the first AP.

14. The portable terminal of claim 10, wherein, when the connection setting indicates a priority for an AP based on a received signal strength indication (RSSI), the at least one processor is further configured to:
    identify whether the portable terminal has ever been previously connected to the first AP,
    identify that the portable terminal is capable of connecting with the second AP,
    identify an RSSI value for the first AP,
    identify an RSSI value for the second AP, compare the RSSI value of the first AP to the RSSI value of the second AP, establish the connection with the first AP when the RSSI value of the first AP is greater than the RSSI value of the second AP, and establish the connection with the second AP when the RSSI value of the second AP is greater than the RSSI value of the first AP.

15. The portable terminal of claim 10, wherein, when the connection setting indicates a priority for an AP based on a service set identification (SSID), the at least one processor is further configured to:

identify whether the portable terminal has ever been previously connected to the first AP or the second AP, based on the connection information, identify an SSID of the first AP and of the second AP, upon identifying that the portable terminal has ever been previously connected to the first AP or the second AP, establish the connection with the first AP when the SSID of the first AP matches a predetermined SSID, and establish the connection with the second AP when the SSID of the second AP matches the predetermined SSID.

16. The portable terminal of claim 10, wherein, when the connection setting indicates a priority for an AP based on a time from a last connection, the at least one processor is further configured to:

identify whether the portable terminal has ever been previously connected to the first AP or the second AP, based on the connection information, establish the connection with the first AP, upon identifying that the portable terminal has most recently been connected to the first AP, and establish the connection with the second AP, upon identifying that the portable terminal has most recently been connected to the second AP.

17. The portable terminal of claim 10, wherein the at least one processor is further configured to:

identify whether the portable terminal has ever been previously connected to the first AP or the second AP, based on the signals received from the first AP and the second AP received, and display a list including the first AP and the second AP on a display unit of the portable terminal, when the portable terminal has not been previously connected to the first AP and to the second AP.

18. The portable terminal of claim 10, further comprising:

a memory, wherein the connection setting is stored in the memory.

19. The portable terminal of claim 10, wherein the first AP is one of a first plurality of APs, wherein the second AP is one of a second plurality of APs, wherein the connection setting and the connection scheme of the first AP comprises a connection setting and a connection scheme for the first plurality of APs, and wherein the connection setting and the connection scheme of the second AP comprises a connection setting and a connection scheme for the second plurality of APs.

20. The method of claim 1, wherein the establishing of the connection to the selected AP comprises automatically establishing the connection with the second AP without user involvement and using credentials stored at the portable terminal, upon selecting the second AP.

21. The portable terminal of claim 10, wherein to establish the connection with the selected AP, the at least one processor is configured to control to establish the connection with the second AP without user involvement and using credentials stored at the portable terminal, upon selecting the second AP.

* * * * *